(12) United States Patent
Beichl

(10) Patent No.: US 6,742,782 B2
(45) Date of Patent: Jun. 1, 2004

(54) SEAL OF NON-HERMETIC DESIGN

(75) Inventor: Stefan Beichl, Herrsching (DE)

(73) Assignee: MTU Aero Engines GmbH, Munich (DE)

( * ) Notice: Subject to any disclaimer, the term of this patent is extended or adjusted under 35 U.S.C. 154(b) by 0 days.

(21) Appl. No.: 09/825,310

(22) Filed: Apr. 3, 2001

(65) Prior Publication Data

US 2001/0030397 A1 Oct. 18, 2001

(30) Foreign Application Priority Data

Apr. 8, 2000 (DE) .......................... 100 17 643

(51) Int. Cl.⁷ ............................. F01D 11/02; F16J 15/16
(52) U.S. Cl. ....................... 277/409; 277/411; 277/500; 277/355
(58) Field of Search ................................. 277/409, 411, 277/413, 412, 416, 500, 543, 546

(56) References Cited

U.S. PATENT DOCUMENTS

| 3,622,737 | A | * | 11/1971 | Trudeau | 165/9 |
|---|---|---|---|---|---|
| 3,741,288 | A | * | 6/1973 | Vallance | 165/9 |
| 4,451,200 | A | * | 5/1984 | Libertini et al. | 384/398 |
| 4,465,427 | A | * | 8/1984 | Libertini et al. | 384/398 |
| 5,005,634 | A | * | 4/1991 | Reeves et al. | 165/9 |
| 5,087,176 | A | * | 2/1992 | Wieland | 415/177 |
| 5,099,886 | A | * | 3/1992 | Squirrell | 137/527 |
| 5,100,158 | A | * | 3/1992 | Gardner | 277/411 |
| 5,632,493 | A | * | 5/1997 | Gardner | 277/411 |
| 5,915,697 | A | * | 6/1999 | Bagepalli et al. | 277/627 |
| 5,934,687 | A | * | 8/1999 | Bagepalli et al. | 277/637 |

FOREIGN PATENT DOCUMENTS

| DE | 44 03 605 | 11/1995 |
|---|---|---|
| DE | 196 18 475 | 11/1997 |
| EP | 0 629 798 | 12/1994 |
| EP | 0 933 567 | 8/1999 |

* cited by examiner

*Primary Examiner*—Anthony Knight
*Assistant Examiner*—Vishal Patel
(74) *Attorney, Agent, or Firm*—Kenyon & Kenyon

(57) ABSTRACT

A seal of non-hermetic design for installation between two components which can move relative to one another, includes a multiplicity of flexurally elastic sealing elements which each have an end connected fixedly to a seal-bearing device and a free, angled end with the point directed toward the surface of the one component, the seal-bearing device being connected fixedly to the other component and supporting the angled ends of the sealing elements at least on one side.

The sealing elements are designed as thin-walled, angled spring leaves and are arranged parallel next to one another and in at least two layers one above the other with alternate overlapping.

20 Claims, 1 Drawing Sheet

SEAL OF NON-HERMETIC DESIGN

FIELD OF THE INVENTION

The invention relates to a seal of non-hermetic design for installation between two components which can move relative to each other, in particular between a rotor and a stator of a turbo-engine, having a multiplicity of flexurally elastic sealing elements which each have an end connected fixedly to a seal-bearing arrangement and a free, angled end with the point directed toward the surface of the one component.

BACKGROUND INFORMATION

A seal of this type is described, for example, in German Published Patent Application No. 196 18 475. The flexurally elastic sealing elements are designed as angled bristles, i.e., this seal is a special design of a brush seal. This design has the advantage that given sufficient elasticity of the bristles, i.e., sufficient bending length, particularly small seal dimensions can be realized in the direction of the angled bristle sections. In the case of a shaft seal having bristle ends angled radially toward the shaft axis, the overall radial height and therefore the diameter of the seal can be made to be extremely small. This criterion may, for example, be decisive if the brush seal is to be installed as a structural replacement for a labyrinth seal where sufficient axial, but little radial, constructional space is available. In the case of an end-face seal, the angled bristle ends are orientated axially, in which case the required bending length can be accommodated in the radial direction. The advantages with regard to a minimum space requirement in one direction, i.e., axially, are apparent. However, the manufacture of such "hook-type brush seals" is relatively complicated and expensive. This is primarily because a multiplicity of angled bristles, for example several hundred bristles, have to be orientated in a defined manner on a bearing arrangement and attached permanently, in which case a multiplicity of bristle layers above or next to one another is generally also required. In addition, the fine, angled, generally metallic bristles are very sensitive and can easily be permanently deformed or broken off.

German Published Patent Application No. 44 03 605 describes the use of flexurally elastic lamellae having a relatively large width transversely to the direction of movement of the component as sealing elements. The lamellae slide in the manner of an obliquely positioned spatula over the surface of the component or over a gas cushion produced dynamically. A shaft seal designed in accordance with this principle has a high leakage rate, since the axial gaps correspond in respect of size and number approximately to the lamellae. The arrangement of a plurality of lamella rings, which are optionally offset angularly, axially one behind another, can only provide a partial remedy. It would therefore also not be possible for this design to be more successful than the brush seal.

In view of the foregoing and the disadvantages thereof, it is an object of the present invention to provide a seal of non-hermetic design having a multiplicity of flexurally elastic, angled sealing elements, which seal is simpler and less expensive to produce and more robust in operation in relation to a conventional brush seal.

The above and other beneficial objects of the present invention are achieved by providing a seal as described herein. Instead of bristles, thin-walled, angled spring leaves are used which are arranged in at least two layers one above the other with alternate overlapping. This arrangement considerably reduces the number of sealing elements. With precise manufacturing of the sealing elements and of the seal-bearing arrangement, the integration of these parts results in the desired seal geometry. Misorientation of sealing elements, as in the case of "hook-type bristles", is virtually eliminated. The outlay on refinishing work is considerably lower. It is also to be expected that the "spring-leaf" sealing elements, in handling, for example in installation and removal of the seal, and in operation, are substantially less sensitive with regard to plastic deformation and fracture than bristles and therefore also withstand higher differential pressures.

DETAILED DESCRIPTION

Figure 1:
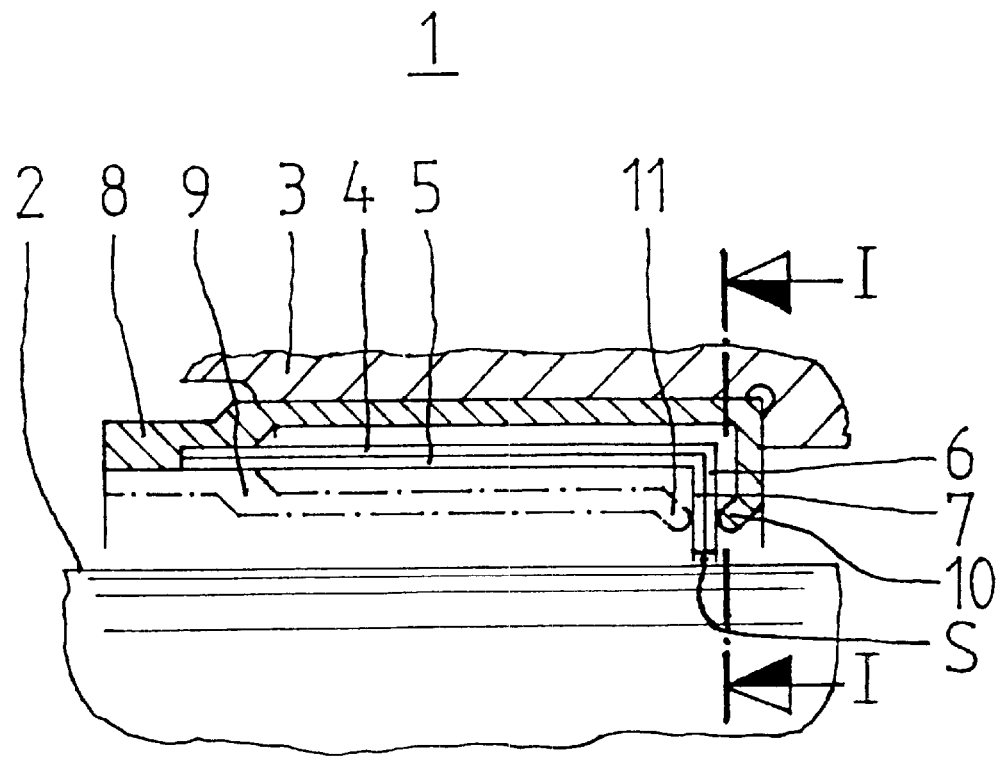
FIG. 1 is an axial/radial cross-sectional view through a seal between a rotor and a stator.

The seal 1 may be a non-hermetic fluid seal between a rotor 2 and a stator 3 of a turbo-engine, for example of a gas-turbine driving mechanism. The seal 1 includes a rotationally symmetrical form which annularly surrounds the rotor 2. The seal 1 includes sealing elements 4, 5 and the seal-bearing device 8, the seal-bearing device 8 being connected fixedly, concentrically, tightly and re-releasably to the stator 3 via a suitable fit. The spring-leaf-like sealing elements 4, 5 may be connected fixedly to the seal-bearing device 8, e.g., in the region of their left, horizontal ends, for example by welding, soldering, bonding, riveting or combinations thereof.

The sealing elements 4, 5 include free ends 6, 7 which are angled toward the rotor 2 and are supported at least on one side against relatively large pressure differences. The right supporting lip 10 is effective if a significantly higher operating pressure prevails on the left side of the ends 6, 7, in which case the radial movability of the ends 6, 7 perpendicular to the surface of the rotor 2 is to be reduced as little as possible. The support is therefore to be low in friction. A modified seal-bearing device 9 is illustrated by dash-dotted lines, the seal-bearing device 9 supporting the ends 6, 7 of the sealing elements 4, 5 from the left, i.e., against excessive pressure from the right, by a sealing lip 11. Should relevant drops in pressure during operation of the seal 1 be anticipated in both directions, a support on both sides of the ends 6, 7 is possible, for example in the form of a seal-bearing device which is composed of the two seal-bearing devices 8, 9 together with supporting lips 10 and 11. Metals and plastics, also fibre-reinforced plastics, are suitable as material for the sealing elements 4, 5 and the seal-bearing devices 8, 9. Ceramic materials are primarily suitable as temperature- and wear-resistant coatings and only secondarily for entire components. "Glass metals", i.e., amorphous metal alloys, may be used for the sealing elements 4, 5. Almost any desired combinations of the abovementioned materials are also possible.

The sealing elements 4, 5 may be manufactured as separate parts and connected first to the seal-bearing devices 8, 9, or a plurality of sealing elements may be formed from one sheet-like, thin-walled part by the part being slit a number of times from one side and the free ends of the resultant, connected tongues being angled. This finally therefore results in a comb-like, integral part having a plurality of angled sealing elements. The comb-like part may be substantially planar or curved in the shape of a part of a circle.

The desired seal may then be assembled from relatively few such parts and a seal-bearing device. This manner of construction is readily understood and therefore not further described herein.

Figure 2:
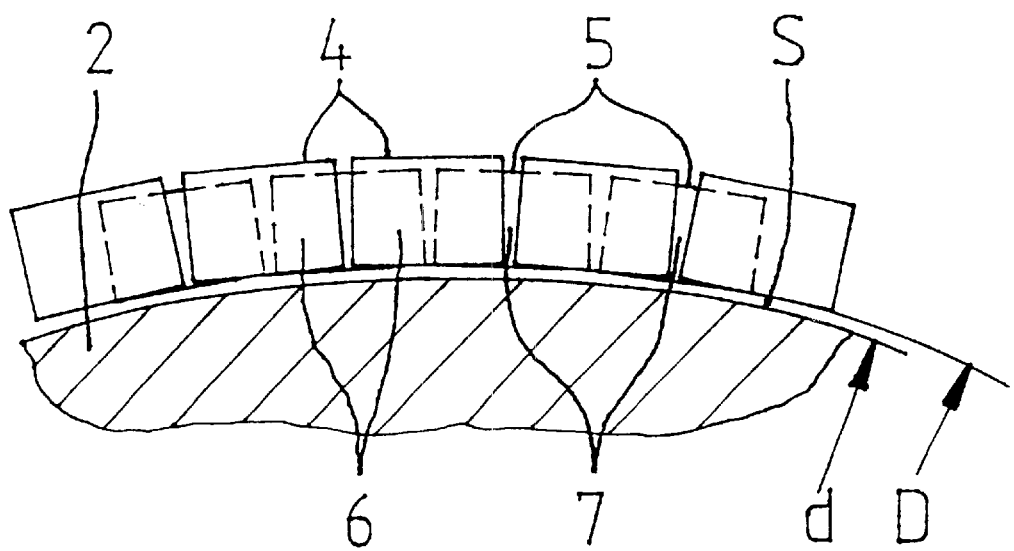
FIG. 2 is a partial cross-sectional view according to the sectional profile I—I illustrated in FIG. 1.

FIG. 2 is a partial cross-sectional view according to the profile I—I illustrated in FIG. 1, through the seal 1, in which, for clarity, only the sealing elements 4, 5 and the rotor 2 are shown. The two-layered arrangement is illustrated in which the sealing elements 4 form the outer layer and the sealing elements 5 form the inner layer. Correspondingly, in this view the angled ends 6 of the sealing elements 4 are disposed at the front and the ends 7 of the sealing elements 5 are disposed behind. The alternate overlapping of the outer and inner sealing elements 4, 5 is illustrated, as well as the position of the gaps or slots between the respectively adjacent sealing elements. The edges, which point toward the rotor 2, of the angled ends 6, 7 are at a tangent or form a circular curve, the diameter D of which corresponds approximately to the external diameter d of the rotor 2. The resultant gap S may be "zero", i.e., the edges of the sealing elements 4, 5 rest in a sliding manner on the surface of the rotor. However, with regard to substantial freedom from wear, a small, defined gap S is generally provided. To obtain a high dimensional accuracy of the seal 1, it may be necessary to finely machine the rotor-side edges of the ends 6, 7, for example, by grinding to the desired nominal internal diameter D.

Starting from the rotationally symmetrical, annular manner of constructing the seal 1 illustrated in FIGS. 1 and 2, it should be understood that a seal according to the present invention may also be manufactured for planar components. The seal-bearing device, which is bent in a circular manner and is self-contained, is replaced by a straight, strip-shaped seal-bearing device of infinite length. The sealing elements are also attached to the seal-bearing device in at least two layers with alternate overlapping, the sealing edges of their angled ends being disposed in one plane. Referring to FIG. 2, the two diameters d and D are increased in size to "infinity", so that the coaxial curves become parallel straight lines.

The seal 1 illustrated in FIGS. 1 and 2 is an axial seal having a difference in pressure in the axial direction. Similarly, the present invention may be configured as a rotationally symmetrical radial seal, for example, in order to seal end faces on rotors. The angled ends of the sealing elements may be arranged in a correspondingly axial manner.

In addition to planar and rotationally symmetrical forms, other designs are also possible, for example, forms that are polygonal or curved in any desired manner in a closed or open arrangement. All of these configurations are readily understood and are therefore not described further herein.

Kinematically, the seal according to the present invention may be used in dynamic seals and in quasi-static seals, i.e., the seal according to the present invention may be used for small, sporadic, slow relative movements and for rapidly running rotors in a stator.

The sealing edges of the resiliently elastic sealing elements may rest in a grinding/sliding manner on a surface of a component. However, these sealing edges may also operate, at least in operation at normal rating, without contact.

Furthermore, the angled, free ends of the sealing elements may engage in a groove in a component, so that the labyrinth effect, which may be achieved in the process, increases the sealing action.

For rotationally symmetrical seals with small diameters, the angled ends may be conically tapered or expanded toward the sealing gap.

What is claimed is:

1. A non-hermetic seal configured to be installed between a first component and a second component, the first component and the second component being relatively movable, comprising:

a seal-bearing device, fixedly connectable to the first component; and a plurality of flexurally elastic sealing elements, each sealing element including a first end fixedly connected to the seal-bearing device and a free, angled second end having an edge, the second end angled relative to the first end with a bend portion arranged between the first end and the second end, the second end extending in a non-parallel direction toward a surface of the second component, the sealing elements being configured as thin-walled, angled spring leaves and being arranged in adjacent parallel arrangement and in at least two alternating, overlapping layers;

wherein the seal-bearing device includes at least one sealing lip configured to support at least one side of the free, angled second ends of the sealing elements.

2. The seal according to claim 1, wherein one of the first component and the second component includes a rotor of a turbo-engine.

3. The seal according to claim 1, wherein one of the first component and the second component includes a stator of a turbo-engine.

4. The seal according to claim 1, wherein a first one of the first component and the second component includes a rotor of a turbo-engine and a second one of the first component and the second component includes a stator of the turbo-engine.

5. The seal according to claim 1, wherein the sealing elements are formed of one of metal and plastic.

6. The seal according to claim 1, wherein the sealing elements are formed of a fiber-reinforced plastic.

7. The seal according to claim 1, wherein the at least one side of the angled ends of the sealing elements supported by the seal-bearing device is the side of the angled ends of the sealing elements under a lower prevailing pressure.

8. The seal according to claim 1, wherein the sealing elements are formed individually.

9. The seal according to claim 1, wherein the sealing elements are formed from a single piece and define an integral comb segment.

10. The seal according to claim 1, wherein the sealing elements are connected to at least one of each other and the seal-bearing device by one of riveting, folding, welding, soldering and bonding.

11. The seal according to claim 1, wherein at least one of the first component and the second component is rotationally symmetrical, and wherein the seal-bearing device is configured annularly.

12. The seal according to claim 1, wherein at least one of the first component and the second component is planar, and wherein the seal-bearing device is strip-shaped.

13. The seal according to claim 1, wherein the second ends extend substantially perpendicular to the surface of the second component.

14. The seal according to claim 1, wherein the seal-bearing device includes a portion extending substantially parallel to the second ends, the sealing lip extending from the portion at an angle of approximately 45° to the second ends.

15. The seal according to claim 1, wherein the seal-bearing device includes a first portion extending substantially parallel to the second ends and a second portion extending substantially perpendicular to the second ends, each of the first portion and the second portion including a corresponding sealing lip extending toward the second ends.

16. The seal according to claim 1, wherein the seal-bearing device includes a first portion extending substantially parallel to the second ends and a second portion extending substantially perpendicular to the second ends, each of the first portion and the second portion including a corresponding sealing lip extending at an angle of approximately 45° to the second ends.

17. The seal according to claim 1, wherein the seal-bearing device includes a first sealing lip configured to support a first side of the free, angled second ends of the sealing elements and a second sealing lip configured to support a second side of the free, angled second ends.

18. The seal according to claim 1, wherein the first component and the second component are rotatable relative to each other.

19. A non-hermetic seal configured to be installed between a first component and a second component, the first component and the second component being relatively movable, comprising:
   at least one seal-bearing device, fixedly connectable to the first component; and
   a plurality of flexurally elastic sealing elements, each sealing element including a first end fixedly connected to the seal-bearing device and a free, angled second end having an edge, the second end angled relative to the first end with a bend portion arranged between the first end and the second end, the second end extending in a substantially perpendicular direction toward a surface of the second component, the sealing elements configured as thin-walled, angled spring leaves and arranged in adjacent parallel arrangement and in at least two alternating, overlapping layers;
   wherein each seal-bearing device includes a sealing lip configured to support at least one side of the free, angled second ends of the sealing elements.

20. A device, comprising:
   a first component;
   a second component, the first component and the second component rotatable relative to each other; and
   a non-hermetic seal arranged between the first component and the second component, the seal including:
      at least one seal-bearing device, fixedly connectable to the first component; and
      a plurality of flexurally elastic sealing elements, each sealing element including a first end fixedly connected to the seal-bearing device and a free, angled second end having an edge, the second end angled relative to the first end with a bend portion arranged between the first end and the second end, the second end extending in a substantially perpendicular direction toward a surface of the second component, the sealing elements configured as thin-walled, angled spring leaves and arranged in adjacent parallel arrangement and in at least two alternating, overlapping layers;
   wherein each seal-bearing device includes a sealing lip configured to support at least one side of the free, angled second ends of the sealing elements.

* * * * *